Feb. 1, 1966     M. D. TYLER     3,233,164
CONSTANT OUTPUT GENERATOR
Filed July 5, 1962
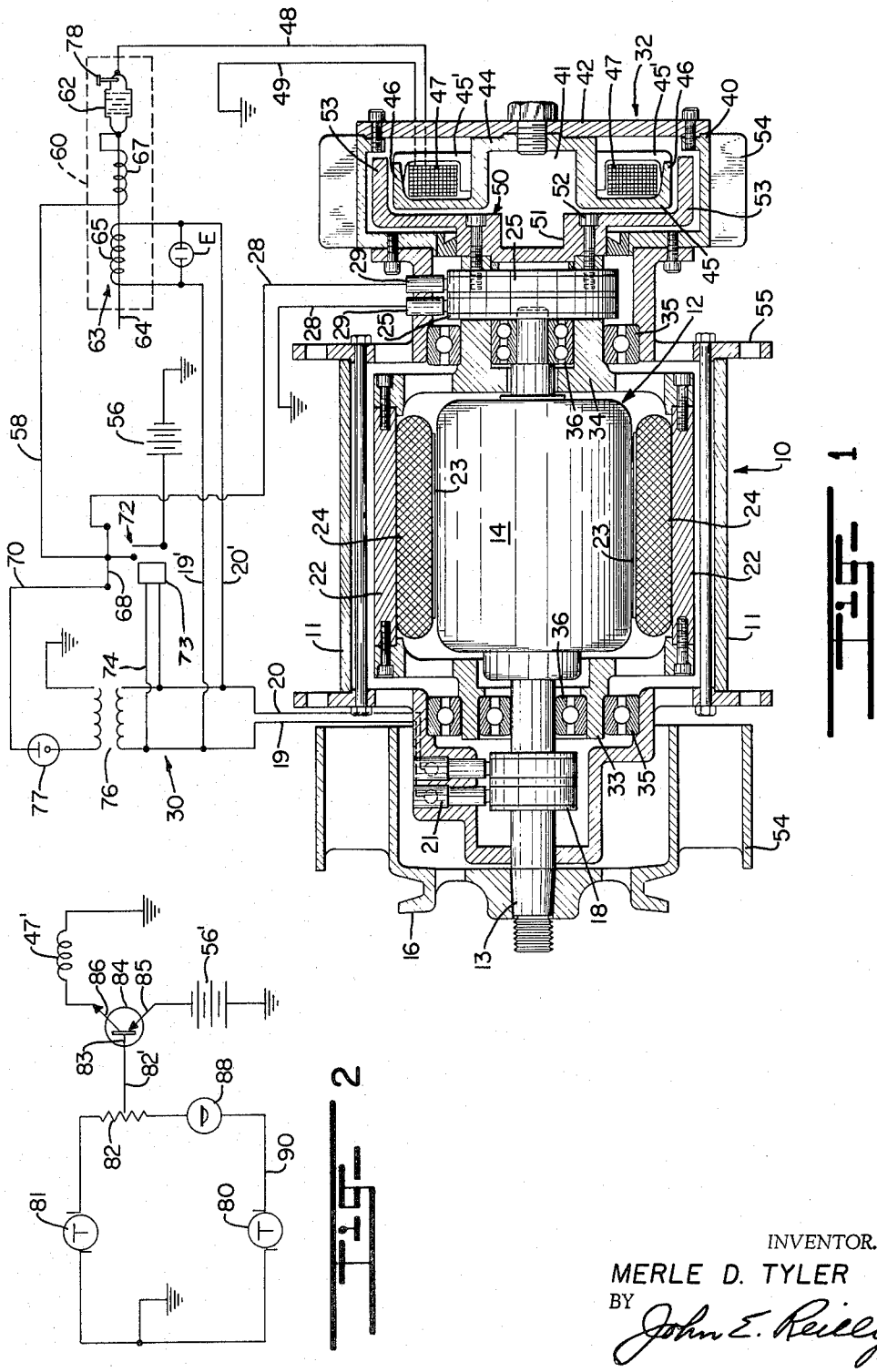
INVENTOR.
MERLE D. TYLER
BY *John E. Reilly*
ATTORNEY

United States Patent Office 3,233,164
Patented Feb. 1, 1966

3,233,164
CONSTANT OUTPUT GENERATOR
Merle D. Tyler, Denver, Colo., assignor to T & T Research & Manufacturing, Inc., Denver, Colo., a corporation of Colorado
Filed July 5, 1962, Ser. No. 207,676
12 Claims. (Cl. 322—28)

This invention relates to electric machines, and more particularly relates to new and useful means for controlling the generated output level and characteristics of alternating current machines.

A principal object of this invention is to provide means for controlling the characteristics of an alternating current generator, operated at variable speeds, in an efficient and simplified manner.

Another object is to provide an accurate and sensitive control for maintaining a selected, constant output level in a generator, operated at varying driven speeds, thereby to enable its effective use in operating portable tools and equipment requiring a constant power supply.

A further object is to provide a novel control circuit adapted to control the relative speed of rotation between the armature and field of a generator according to variations in output from the generator; and moreover, to provide for an adjustable control circuit capable of imposing close, accurate control over generator performance independently of loan and variations in driving speeds.

In accordance with the present invention, a generator has been devised to include an automatic control capable of positively regulating the electrical output independently of load and input speed variations. In a generator, the amount of electrical energy developed, or voltage generated, will correspond to the strength of the magnetic field as well as the relative physical motion between the armature and field. However, with a constant field strength, the generated voltage can be made to be dependent solely upon the relative physical motion between the elements, so that the desired electrical output characteristics, particularly voltage and frequency, can be correlated with the differential speed of rotation between the armature and the field, or vice versa. If one element is stationary, as is conventional practice, the output characteristics would then be directly related to the speed of rotation of the rotating element and under variable drive speeds the output would fluctuate in accordance with changes in input speeds. In a number of applications, however, it is desirable to establish selected, constant output characteristics, notwithstanding variations in speed of the rotating element, for example, the armature. If the normally stationary element, for example the field, is permitted to slip or rotate under the influence of the armature and is selectively and positively retarded, the generated voltage may then be governed by regulating the differential speed of rotation between the elements. An important feature of the present invention accordingly resides in such an arrangement wherein the extent of retardation or damping of the field is closely and accurately controlled to maintain a constant differential speed of rotation between the field and armature, and as a result to maintain a constant output value. Stated another way, under variations in speed of the armature, a rotatable field may be controlled to undergo proportional variations in speed to maintain a constant generated voltage.

Additional features of the present invention are directed to providing a way of instantaneously sensing changes in differential speed or generated output characteristics, producing a signal varying universely to such changes, and regulating one of the elements according to the signal produced to oppose the change in speed setting or output level. The above and other objects, advantages and features of the present invention will become more readily appreciated and understood from a consideration of the following description of preferred and modified forms thereof, taken together with the accompanying drawings, in which:

FIGURE 1 is a longitudinal section view of a preferred form of alternator-control unit in accordance with the present invention; and FIGURE 2 is a diagrammatic view of a modified form of control circuit for use in conjunction with an alternator of the type shown in FIGURE 1.

Referring more particularly to FIGURE 1, there is shown by way of illustrative example an alternator 10 broadly comprised of a stationary housing or casing 11 in which is mounted a rotatable armature 12 consisting of a drive shaft 13, armature core 14 and an armature winding, not shown, all of which conventionally define the current carrying conductor for the generator. Here, the shaft may be driven by any suitable form of prime mover, such as, a pulley 16 operated off of a variable speed drive, not shown, and which pulley is keyed to the shaft 13 for rotation thereof. Although not shown, the armature winding has free ends connected to slip ring terminals 18 at one end of the drive shaft, and connection is made to an external circuit E by conducting lines 19 and 20 leading from brushes or pickups 21 mounted in the housing and being aligned to bear on the slip rings 18.

In FIGURE 1, the field structure is illustrated as being positioned in outer concentric relation to the armature and generally consists of a frame 22 having inwardly projecting, salient poles 23 of opposite polarity and a field winding 24 wound on the field core or poles 23. To excite the field, the field winding 24 may be suitably supplied through slip rings 25 from a D.-C. power source, to be described, connected through one of the leads 28 to a tap 29 which bears against one of the slip rings 25; the opposite tap 29 and lead 28 connect the field to ground. Assuming that the field were stationary, the alternator would conventionally function as a revolving-armature, synchronous generator producing by electromagnetic induction an alternating voltage between the terminals 18 due to the movement of the armature through the magnetic field. As a result, the voltage generated would be proportional to the strength of the field and the rate of movement of the armature through the magnetic field.

In accordance with the present invention, to maintain a constant output notwithstanding variations in speed of the variable speed drive 16, the field structure is permitted to rotate in controlled response to the movement of the armature, the control being imposed by a signal produced in a control circuit 30 so as to establish a constant differential speed of rotation between the field and armature corresponding to the desired voltage output of the generator. In the preferred form, the control circuit is made to be responsive to the generated output of the generator to produce a signal inversely proportional to variations in output. In turn, the signal is applied to an electromagnetic damper or brake assembly 32, mounted at one end of the generator housing, the latter controlling the speed of rotation of the field structure. Accordingly, the frame 22 of the field structure includes longitudinally extending sleeves 33 and 34 at opposite ends thereof which sleeves are journaled for rotation between outer bearings 35, positioned between each sleeve and the housing, and inner bearings 36 interpositioned between each sleeve and the shaft 13. Additionally, the sleeve 34 projects beyond the end bearings through the slip ring assembly 25 for driving connection to the brake assembly.

Preferably, the brake assembly 32 is mounted in a separate housing 40 bolted to one end of the housing 11, the housing being of generally cup-shaped configuration to form an annular cavity 41 therein, with the open side of the cavity being closed by an end plate 42. Positioned in stationary relation within the cavity is a frame 44 bolted to the end plate and having spaced, outwardly extending portions 45 and 45' terminating in alternate, oppositely directed pole elements 46, alternate poles being of opposite polarity. Positioned between the portions 45 and 45' is a damper coil 47 to be excited in a controlled manner by the control circuit through lines 48 and 49. A rotor 50, also of generally cup-shaped configuration, is interposed between the frame 44 and housing 40 including a hub 51 connected by screws 52 to the end of the sleeve 34, and an outer magnetic ring portion 53 coextensive with the outer surfaces of the pole elements 46. When the damper coil is energized by the control circuit it will develop a magnetic field such that the magnetic lines of force will tend to retard the movement of the rotor 50, which would otherwise rotate along with the field structure under the influence of the movement of the armature. Thus, the field will be retarded in movement, the degree of which will depend upon the degree of excitation of the damper coil; and in this relation, as the speed of rotation of the field is decreased, the differential speed of rotation between the armature and field will increase thereby to increase the generated voltage developed therebetween. From this it will be seen that the signal produced in the control circuit must be inversely proportional to the change in generated voltage output from any given selected setting, since effectively the differential speed of rotation developed will also vary inversely with the degree of excitation of the damper coil. Various types of electric and electromagnetic braking field members may be employed to exert the desired control over the field structure, and the assembly described is more for the purpose of illustration than limitation in the present invention. Moreover, in accord with conventional practice, air-cooling fins 54 may be associated with the drive pulley 16 and housing 40, and a mounting bracket 55 is shown mounted on the exterior of the generator.

Since the differential speed of rotation between the armature and field will govern the energy generated, the generated voltage across the slip rings 18 and pickups 21 will afford an instantaneous measurement of any variations in differential speed. Accordingly, the voltage across conductors 19 and 20 leading to the external circuit E through lines 19' and 20' may be employed as a means for sensing any variations in speed and generated output; or, the frequency characteristics of the voltage may be determined and used to detect output variations in that the frequency will vary as a function of the differential speed of rotation. To develop a signal which will oppose such variations, or most preferably will be inversely related to such variations, signal-producing means is provided in the control circuit between the external circuit connections 19' and 20' and the damper coil 47. Broadly, the signal-producing means is defined by an external power source, here in the form of battery 56, and a variable control unit 60 in line 58 interconnecting the battery 56 and the coil 47. Preferably the control unit consists of a voltage regulator, such as the type GDA-12C Voltage Regulator manufactured by General Electric, having a variable resistance or rheostatic element composed of carbon washer-like members represented at 62 connected in series with the battery and damper coil to effectively form a closed circuit therewith. A voltage-sensitive member 63 including a plunger or link 64 is aligned with one end of the elements 62 to control their effective resistance according to the pressure exerted by the plunger. In turn, the movement of the plunger is controlled by the primary coil 65 of the member 63 which is connected to the external circuit lines 19' and 20' so that, for example, when energized the plunger will be retracted to increase the resistance of the elements 62, resulting in an increased voltage drop thereacross and a lower voltage and current supply to the damper. Conversely, a reduction in voltage across the coil 65 will permit inward movement of the plunger causing a lower resistance and voltage level according to the extent of movement of the plunger and a corresponding increase in voltage and current in the damper coil.

Considering the remainder of the control circuit, movement of the plunger 64 may be stabilized by use of a secondary coil 67 in the solenoid, the coil being connected in the line 58 so as to be energized by the battery. Here, the line 58 is preferably connected to a contact strip 68 which serves also as a common point of connection for the line 28, leading to the field of the generator, and a low voltage line 70. The lines 28, 58 and 70 are connected to the positive side of the battery 56 through a control relay 72 having a relay coil 73 energized by the generator through leads 74. In this way the control circuit will not operate until the generator is driven to produce a voltage level sufficient to close the relay 72. The line 70 leads from the secondary side of a step-down transformer 76, the primary side being connected across the lines 19 and 20. The transformer is designed to reduce the generated voltage to a level corresponding to that of the battery source. Also, a half-wave rectifier 77 is positioned in the line 70 to rectify the alternating current in order to supply pulsating direct current for the purpose of recharging the battery 56.

In operation, the battery 56 will supply direct current to maintain a constant strength in the field, and additionally will supply direct current through the variable resistance in the voltage regulator 60 to the damper coil 47. Since the voltage drop across the variable resistance will change according to fluctuations in voltage across the primary coil, similarly the damper coil will be excited in inverse relation to the amount of voltage drop across the variable resistance 62. In practice, a potentiometer or screw adjustment 78 may be positioned in association with the variable resistance elements to establish the initial setting of the regulator corresponding to the desired generated voltage output of the alternator. Thus, assuming it is desired to provide an output of 115 volts at 60 cycles, and the differential speed of rotation between the armature and field necessary to establish this output is 3600 r.p.m., the resistance 62 may be adjusted by the screw 78 such that maximum voltage will be applied to the damper coil to completely brake the movement of the field until the armature reaches the maximum speed setting of 3600 r.p.m. Due to variations in speed of the armature, if the armature revolves at a speed higher than 3600 r.p.m. the generated voltage will correspondingly increase and the primary coil 65 will have a higher voltage applied thereacross so as to retract the plunger 64 an amount corresponding to the voltage change. This will permit expansion of the washers and an increase in resistance resulting in a corresponding reduction in voltage and current supply to the damper coil, whereby the field assembly will begin to slip or rotate under the influence of the armature thus reducing the total effective speed of rotation between the armature and field. Accordingly, the signal-producing circuit will govern the electro-magnetic brake assembly in response to variations in electric output from the generator to maintain a constant differential speed of rotation between the armature and field and in such a way as to correct for any fluctuations in generated voltage.

A modified form of control circuit is shown schematically in FIGURE 2 in which miniature, compact tachometers 80 and 81 are mounted on the armature and the field, of a generator of the type illustrated in FIGURE 1, to measure directly the speeds of rotation thereof, respectively. Essentially, the signals produced by the tachometers are compared by means of a variable resistance in the form of a potentiometer 82, and a resultant signal is supplied through line 82' to the common base 83 of a power transistor 84. The transistor has its collector side 85 connected to a battery source 56' and the emitter 86 side is connected to the damper coil 47' for the generator. A low level switching device, such as, a tunnel diode 88 is connected in line 90 between the armature tachometer 86 and potentiometer 82, the diode being designed to prevent current flow up to a predetermined voltage level representative of the desired constant output level of the generator; above that level the diode is highly conductive with minimum resistance so that the potentiometer will sense differences in voltage developed by the armature and tachometers above the specified maximum voltage level. Typical diodes useable for this purpose are the germanium-type diodes, TD Series manufactured by General Electric. Up to the point that the diode holds the circuit open, the battery 56' will supply maximum voltage to the damper coil to brake the movement of the field and its associated tachometer. In the event that the armature speed and voltage exceed the specified maximum, both tachometers will generate a voltage corresponding to the individual speeds of rotation of the armature and field, the diode will conduct current from the armature tachometer, and the potentiometer will measure the difference in voltage between the tachometers. The resultant signal corresponding to the voltage difference, or speed, is applied through line 82' to the base of the transistor, exerting a positive bias on the transistor to reduce current flow therethrough from the battery and thus will operate in essentially the same manner as the control circuit of FIGURE 1. Of course the field will rotate only when the armature speed of rotation exceeds the specified maximum corresponding to the desired constant output of the generator. When this occurs the positive bias applied to the transistor will immediately reduce the level of excitation of the damper coil and permit the field to slip until the armature speed returns to the desired level, at which time the diode 88 will open. For continued increases in armature speed of rotation the signal applied to the transistor will correspondingly increase, still further reducing the current supply to the damper coil so that the field will rotate at a faster rate thus maintaining a constant differential speed of rotation between the armature and field and a constant output value. In this form, excitation of the damper coil is made to be more directly responsive to differential speeds of rotation of the armature and field, as opposed to making it responsive to voltage output. The advantage of this is that the damper coil will vary directly with variations in differential speed of rotation causing the fluctuations in generated voltage; otherwise, if the damper coil is responsive to fluctuations in generated voltage only, although the voltage will closely follow changes in differential speed of rotation it will not be directly proportional thereto at higher speeds of rotation. For this reason, in a number of applications it is more desirable to relate the operation of the damper coil either directly to the differential speed of rotation between the armature and field, or to the frequency characteristics of the generated voltage from the alternator since the frequency will vary in more direct relation to the changes in speed. It will be apparent here that various means may be employed to sense changes in frequency and to apply signals inversely proportional to such changes to control the performance of the damper coil and field in relation to the armature shaft. Also, various switching circuits may be effectively employed in the circuit shown in FIGURE 2 in place of the diode, and for example a junction transistor may be utilized to provide the necessary effective resistance characteristics to control on-off operation of the entire circuit.

From the foregoing, it will be apparent that various changes and modifications may be made in the details of design and construction of the control circuit to impart the desired control to the movement of the field in relation to the armature, depending upon the given application and degree of variation in speed of the prime mover for the armature, as well as the desired speed setting for the generator. For the purpose of illustration, an alternator with a rotating field may be driven by an automobile or marine engine, or rotary turbine units to produce a constant voltage and frequency output capable of operating television or radio communication sets, refrigeration units, aircraft accessories or portable power tools. Accordingly, it will be understood that any such modifications as are necessary for adaptation of the present invention to various applications may be made and resorted to without departing from the spirit and scope thereof, as defined by the appended claims and reasonable equivalents thereof.

I claim:

1. In a generator having rotatable current-carrying conductor and magnetic field members with drive means for rotating one of the numbers to generate an electrical output related to the differential speed of rotation between the members, the combination therewith of sensing means for sensing variations in speed and generated output between the members, electrical signal-producing means associated with said sensing means for developing an electrical signal and strength of which varies inversely to variations in speed and generated output from a selected reference setting, and damping means connected to the other of said members and being electrically responsive to applied signals from said signal-producing means to control the speed of rotation of the other of said members in accordance with the strength of the signal applied thereto whereby to maintain a constant generated output level notwithstanding variations in speed of the drive means.

2. In a generator according to claim 1, said damping means being further characterized by a rotor connected to the other of said members with a damping coil to selectively retard the movement of said rotor, and said signal-producing means being operative to deliver a signal to said damping coil inversely related to the amount of variation of the generated output from the selected reference setting.

3. In a generator having a rotatable armature and field with drive means for rotating the armature to generate an electrical output related to the differential speed of rotation between the armature and field, the combination therewith of a field control circuit including sensing means for sensing variations in speed and generated electrical output between the armature and field, signal-producing means for developing an electrical signal the strength of which varies inversely to variations in speed and generated output from a selected reference setting, and damping means interconnected between said field and said field control circuit being electrically responsive to the strength of the signal developed by said signal-producing means to control the speed of rotation of the field relative to the armature whereby to maintain a constant generated output level notwithstanding variations in speed of the armature.

4. In a generator according to claim 3, said sensing means being defined by electrical conductors to sense the generated voltage output of the generator, and said signal-producing means including a constant power source and inverting means between said power source and said field control means to automatically vary the voltage drop therebetween in accordance with variations in generated voltage received by said sensing means whereupon the voltage across said field control means will vary inversely with variations in generated voltage.

5. In a generator according to claim 3, said sensing means being defined by speed sensing members connected to said armature and field, and said signal-producing means including a power supply to energize said field control means, a speed measuring circuit to develop signals proportional to the differences in speed between the armature and field and inverting means responsive to signals from said speed measuring circuit to vary the energization of said field control means in inverse relation to variations in the signals from said speed measuring circuit.

6. An alternator comprising armature and field members rotatable in a common direction with variable drive means for rotating one of said members in relation to the other of said members thereby to generate a voltage corresponding to the differential speed of rotation therebetween, electromagnetic damping means including a field to dampen the rotation of the other member under the influence of said one member, said damping means retarding the movement of said other member in proportion to the supply of current thereto, and signal control means connected to said damping means to deliver current thereto inversely proportional to fluctuations in speed and generated electrical output of the generator thereby to maintain a substantially constant differential speed of rotation between said armature and field members.

7. An alternator comprising rotatable armature and field members with drive means for rotating one of said members in relation to the other of said members to generate a voltage corresponding to the differential speed of rotation therebetween, electromagnetic damping means including a field to dampen the rotation of said other member under the influence of the one member, said damping means retarding the movement of the other member in proportion to the supply of current thereto, sensing means for measuring the voltage output of the generator and a signal-control circuit including a constant power supply connected to the field of said damping means, voltage regulating means interposed between said power supply and damping means being responsive to fluctuations in voltage as measured by said sensing means to control the current supplied to said damping means in inverse relation to the voltage across said sensing means thereby to maintain a constant differential speed of rotation between the armature and field members notwithstanding variations in speed of said drive means.

8. An alternator according to claim 7, said voltage regulating means being defined by a voltage regulator having a variable resistance connected in series between said power supply and the field of said damping means, a plunger being movable in relation to said variable resistance to establish the resistance level thereof and a voltage-sensitive element connected to said sensing means to control the movement of said plunger in response to fluctuations in generated voltage whereby to control the resistance level of said variable resistance in accordance with variations in generated voltage of said sensing means.

9. An alternator according to claim 8, said voltage regulator having adjustment means to select an initial resistance level of said variable resistance in relation to a given generated voltage level.

10. An alternator having a stationary housing, an armature and field rotatable in the housing with drive means for rotating the armature to generate a voltage corresponding to the differential speed of rotation between the armature and field, an electromagnetic brake assembly including a damping coil to dampen the rotation of the field under the influence of rotation of the armature, said brake assembly retarding the movement of the field in relation to the supply of current to the field of said brake assembly, speed measuring means associated with each of said armature and field members to generate a voltage in accordance with the speeds of rotation of said members, voltage comparing means to measure the differences in generated voltage between the speed measuring means and to apply a signal corresponding to the differences in voltage, and signaling means including a power supply connected to the field of said brake assembly and voltage control means between said power supply and the field, said voltage control means being biased by the signal produced by said voltage comparing means to control the amount of current delivered by said power supply in inverse relation to the strength of the signal received thereby to maintain a substantially constant differential speed of rotation and generated voltage output between the armature and field of the generator.

11. An alternator according to claim 10 being further characterized by having on-off switching means between said speed measuring means and voltage control means to selectively close in response to a predetermined generated voltage developed by at least one of said speed measuring means.

12. An alternator according to claim 10, said speed measuring means being defined by D.-C. generators associated with the armature and field, respectively, of the generator, and said voltage comparing means being defined by a potentiometer.

References Cited by the Examiner
UNITED STATES PATENTS
699,388 5/1902 Hutchins.
3,105,931 10/1963 Glassie et al. _____ 322—28

LLOYD McCOLLUM, *Primary Examiner.*